US009811595B2

(12) United States Patent
Elango

(10) Patent No.: US 9,811,595 B2
(45) Date of Patent: Nov. 7, 2017

(54) MISSED MEDIA SYSTEM AND METHOD

(75) Inventor: Pradheep Elango, Mountain View, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 850 days.

(21) Appl. No.: 13/332,696

(22) Filed: Dec. 21, 2011

(65) Prior Publication Data

US 2013/0166673 A1    Jun. 27, 2013

(51) Int. Cl.
*G06F 15/16* (2006.01)
*G06F 17/30* (2006.01)

(52) U.S. Cl.
CPC .... *G06F 17/30867* (2013.01); *G06F 17/3089* (2013.01); *G06F 17/30899* (2013.01)

(58) Field of Classification Search
CPC ... H04L 67/325; H04L 67/30; G06F 17/3089; G06F 17/30867; G06F 17/30899
USPC ........................................................ 709/217
See application file for complete search history.

(56) References Cited

U.S. PATENT DOCUMENTS

| 6,381,644 B2 * | 4/2002 | Munguia et al. ............ 709/225 |
| 6,769,009 B1 * | 7/2004 | Reisman ...................... 709/201 |
| 8,001,215 B2 * | 8/2011 | Dominowska .... G06F 17/30867 709/218 |
| 8,321,499 B2 * | 11/2012 | Reisman ...................... 709/203 |
| 8,635,272 B2 * | 1/2014 | Reisman ...................... 709/203 |
| 8,825,872 B2 * | 9/2014 | Reisman ...................... 709/227 |
| 2005/0182824 A1 * | 8/2005 | Cotte ........................... 709/217 |
| 2007/0204308 A1 * | 8/2007 | Nicholas ............ H04N 7/17318 725/86 |
| 2008/0214148 A1 * | 9/2008 | Ramer ............. G06F 17/30749 455/414.1 |
| 2008/0215607 A1 * | 9/2008 | Kaushansky .......... G06Q 30/02 |
| 2008/0275884 A1 * | 11/2008 | Yoshida ................. G06Q 30/02 |
| 2012/0084348 A1 * | 4/2012 | Lee ......................... G06Q 30/02 709/203 |
| 2012/0084349 A1 * | 4/2012 | Lee ......................... G06Q 30/02 709/203 |
| 2013/0047123 A1 * | 2/2013 | May ........................ G06F 3/0482 715/834 |

* cited by examiner

*Primary Examiner* — Kristie Shingles
(74) *Attorney, Agent, or Firm* — James J. DeCarlo; Greenerg Traurig, LLP

(57) ABSTRACT

A web site receives, by a computer, a request from a user device to display a news item web page. The computer determines a time and date that the user previously visited the web site to view news items, identifies news items published after the determined time and date, dynamically generates a web page including at least a portion of the identified news items, and transmits the generated web page to the user device.

22 Claims, 5 Drawing Sheets

MISSED MEDIA SYSTEM AND METHOD

FIELD

The present disclosure relates to web pages, and more specifically to displaying news items on a web page.

BACKGROUND

Many news stories develop over time, such as a few minutes, hours, days, weeks, or months. Web pages display these news stories and publish additional news stories as the stories develop.

SUMMARY

This disclosure relates to a system and method for displaying news on a web page that a user missed during an elapsed time.

Some users who navigate to web pages on websites do not navigate to the site's web pages frequently. As a result, these users miss the developments in the news story. The user can lose track of an important news story that the user may have cared about. Additionally, the user may read a news story that has been developing (e.g., over the last few days) and may find it hard to understand because the user missed certain developments of the news story.

For example, a high profile trial may take several weeks or months from start to finish. If a user visits a web site displaying news at the start of the trial, the user can read about the trial when it starts. If the user does not again visit this web site for a week, and then tries to read another news story about the trial, the user will likely be confused when reading the story because the user has likely missed some key developments in the trial that occurred during the past week.

In one aspect, a web site receives, by a computer, a request from a user device to display a news item web page. The computer determines a time and date that the user previously visited the web site to view news items, identifies news items published after the determined time and date, dynamically generates a web page including at least a portion of the identified news items, and transmits the generated web page to the user device.

In one embodiment, the computer determines a topic of one or more of the news items viewed by the user and identifies news items published after the determined time and date about the one or more topics. In one embodiment, the computer retrieves a cookie associated with the user from the user device, where the cookie includes the time and date that the user previously visited the web site. In one embodiment, the computer obtains a user profile associated with the user, where the user profile includes the time and date that the user previously visited the web site.

In one embodiment, the computer determines a location of the user device and identifies news items associated with the location. In one embodiment, computer transmits an advertisement to the user device, where the advertisement is related to at least a portion of the identified news items. In one embodiment, the computer transmits the generated web page to a social network connection of the user on a social network.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
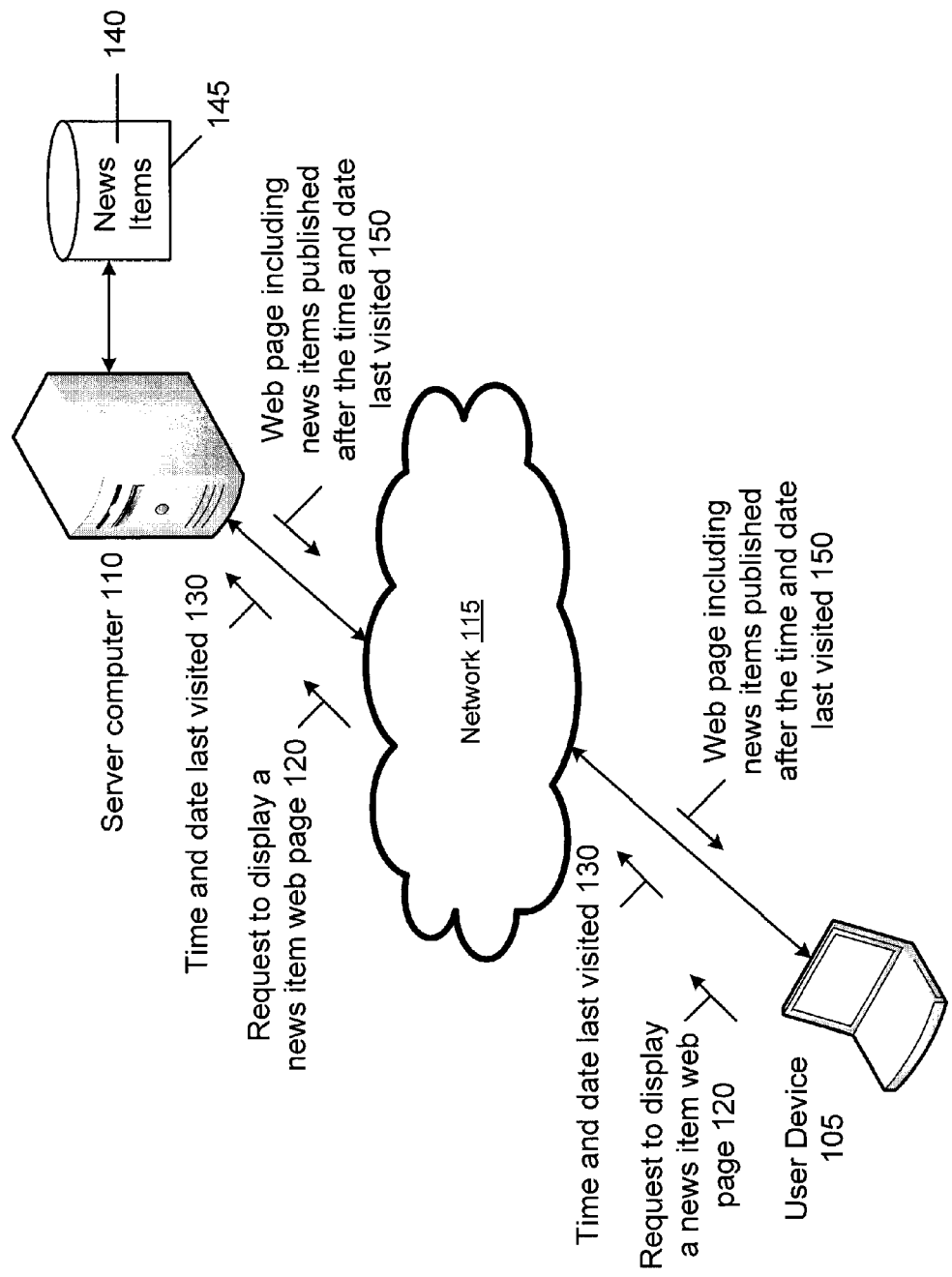
FIG. 1 is a block diagram of a user device communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

FIG. 1 is a block diagram of an embodiment of a user device 105 communicating with a server computer 110 over a network 115 such as the Internet. A user uses a browser on the user device 105 to access the Internet and submit a request 120 to display a news item web page 120 containing one or more news items. The web page is updated periodically (e.g., after a predetermined amount of time has elapsed, such as a few seconds, a few minutes, a few hours, etc.). A news item as used herein is a web page, portion of a web page, article, headline, email, text message, or any other media item that includes text, images, video, and/or sound. The user device 105 transmits the request 120 to the server computer 110 over the network 115. In one embodiment, the user device 105 also transmits a time and date 130 that the user last visited the requested web page 120 using the user device 105, or this time and date is recorded by the web site or web page, by storing the time and date of site access, web ite navigation, and/or news item access in a database and/or in association with a user profile maintained by or accessible to the web site or web page or the user's computing device or browser. In one embodiment, the server computer 110 retrieves this time and date 130 from a cookie stored on the user device 105. The server computer 110 accesses news items 140 (e.g., stored on a database 145 or from the network 115) and then transmits the requested web page 150 to the user device 105, where the requested web page 150 includes news items that were published after the time and date of the user's last visit to the web site (e.g., the time difference between the current time and the time last visited 130). The user can then view the news items 150 that the user missed over the elapsed time period.

For purposes of this disclosure, a computer such as the user device 105 includes a processor and memory for storing and executing program code, data and software. Computers can be provided with operating systems that allow the execution of software applications in order to manipulate data. User device 105 can be any device that can display a website and that can be used by a user. Personal computers, servers, personal digital assistants (PDAs), wireless devices, smartphones, cellular telephones, tablet computers, internet appliances, media players, home theater systems, and media centers are several non-limiting examples of computers.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. A number of program modules and data files can be stored on a computer readable medium of the server. They can include an operating system suitable for controlling the operation of a networked server computer, such as the WINDOWS 7, WINDOWS VISTA, or WINDOWS XP operating system published by Microsoft Corporation of Redmond, Wash., or the Ubuntu operating system distributed by Canonical Ldt. of Douglas, Isle of Mann.

Figure 2:
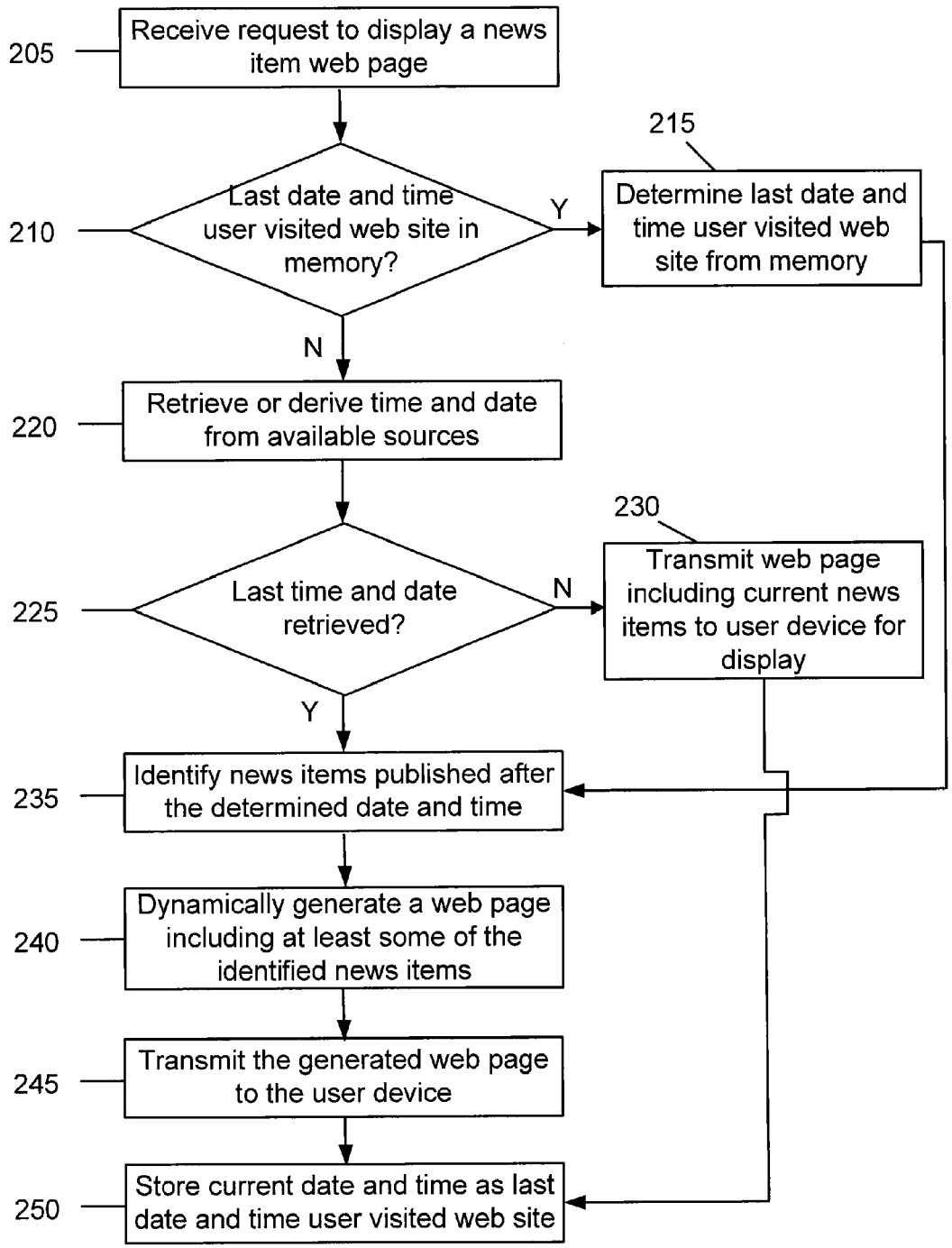
FIG. 2 is a flowchart illustrating steps performed by the server computer of FIG. 1 in accordance with an embodiment of the present disclosure.

FIG. 2 is a flowchart illustrating an embodiment of steps performed by the server computer 110 to transmit the news items that a user missed over an elapsed period of time to the user device 105.

In one embodiment, the user of the user device 105 logs into a site or a web page provided by a service provider (such as for example YAHOO! or GOOGLE or MICROSOFT). The server computer 110 associated with the service provider receives a request 120 for a news item web page having one or more news items or links to news items (step 205). It should be noted that the user login may occur at any time, such as before step 205 (e.g., on a home page) or after step 205 (e.g., on a web page displaying news items). In one embodiment, if the user has logged into a web page, the server computer 110 stores the date and time that the user is visiting the web page and associates this information (e.g., in a user profile or in a cookie) with the user's login information. If the user does not log in, other options for noting time and date of access and items viewed may be used, such as by way of non-limiting example, recording IP address information or mobile or tablet device identification information, or cookie placement in a browser.

The server computer 110 then determines if the last date and time the user visited the web site are stored in memory (internal memory or external memory (e.g., a database, such as database 145)) (step 210) or accessible through some other way, such as exchanging information from other websites visited by the user or direct interrogation of the user. In one embodiment, the server computer 110 determines this information based on the user's login information by which a user profile or other database of user related information can be interrogated. If the last date and time the user visited the web site are stored in memory or otherwise accessible or identifiable (step 210), the server computer 110 retrieves that information (step 215). If the last time the user visited the web site are not stored in memory (e.g., the user has not logged into a web page provided by the service provider), in one embodiment the server computer 110 retrieves or derives the time and date from available sources (step 220) (e.g., retrieves a cookie from the user device 105) and determines if the last date and time are stored (e.g., in the cookie) (step 225). If the server computer 110 cannot determine the last date and time the user visited the web site (e.g., via login information or via a cookie), the server computer 110 transmits a web page including the current news items to the user device 105 for display on the user device 105 (step 230), or it can serve a question to the user to identify a previous time of access or a preferred past time period over which to retrieve news the user might have missed. The server computer 110 then stores the current date and time as the last date and time the user visited the web page (step 250).

Assuming in an embodiment that the server computer 110 determines the last date and time the user visited the web site from a cookie or from memory, the server computer 110 identifies news items that have been published during the elapsed time (e.g., the time between the current date and time and the last date and time that the user visited the web site) (step 235). In one embodiment, the server computer 110 stores news items in database 145 and determines these news items from the stored news items 140. In another embodiment, the server computer 110 obtains news items that have been published during the elapsed time from the network 115. In one embodiment, the server computer 110 dynamically generates a web page including at least some of the identified news items that were published during the elapsed time (step 240). In one embodiment, the server computer 110 dynamically generates the web page with a tab on the web page that, when clicked, will bring the user to news items that the user has missed since last visiting the web page. The server computer 110 then transmits the generated web page to the user device 105 (step 245). In one embodiment, the server computer 110 stores (in memory or in a cookie) the current date and time as the last date and time that the user visited the web page (step 250).

In one embodiment, the server computer 110 retrieves a user profile from memory or via a network from a remote database or other storage device to determine the last date and time the user visited the web site. The user profile may include the last date and time the user visited the web site and the user's login information.

The server computer 110 may determine the news items to display on the web page during the elapsed time based on a variety of factors. In an embodiment the news items to display are topically or subject matter related to previously viewed news items (for example stories concerning the 2012 presidential election). In one embodiment, the server computer 110 determines a location of the user device 105, such as via an IP address associated with the user device 105 and retrieved from a cookie on the user device 105 or via an express location preference contained in the user's profile. The server computer 110 uses this location information to adjust the news items presented to the user in the generated web page. For example, if the server computer 110 determines that the user device 105 is in Sunnyvale, Calif., the server computer 110 may transmits missed news items that are local to Sunnyvale, Calif. or that are related to Sunnyvale, Calif.

In one embodiment, the news items transmitted and displayed are personalized to the user. For example, the user may view a news item on a particular topic during a first visit to the web site. A week later, when the user returns to the web site, the server computer 110 can dynamically generate the web page including one or more news items related to the same topic. The server computer 110 can determine the one or more user interests of the user via the user profile, via the login information, via the cookie, via previously selected news items or other sections/tabs on the web pag, by way of non-limiting example. As a specific example, if the user has previously selected news items about the New York Jets, then the server computer 110 can display several news items related to the New York Jets that have been published during the elapsed time between user visits to the web page.

The time difference between visits may be minutes, hours, days, weeks, months, etc. In one embodiment, different kinds of content is presented to the user based on how great the time difference is between visits. For example, if the user hasn't visited the web page in a few weeks, the server computer 110 may display the most popular news items (or links to the most popular news items) that have been published during these few weeks. If the user hasn't visited the web page in a few minutes, the server computer 110 may display any news item updates (or links to these updates) that have occurred during these few minutes. In one embodiment, the server computer 110 also displays a timeline next to each news item to indicate when the news item was published (e.g., was published on the web or elsewhere) relative to the current date and time.

In one embodiment, the server computer 110 is in communication with an advertisement server. The advertisement server may be a module or component within the server computer 110 or an external module or component or service or third party service. In one embodiment, the server computer 110 transmits a request for an advertisement to the advertisement server. In one embodiment, the request is for an advertisement related to the news items during the elapsed time period. The advertisement server transmits an advertisement to the server computer 110, and in one embodiment the server computer 110 transmits the advertisement as part of the news item.

Thus, the advertisement server can serve relevant advertisements based on the news items during the elapsed time to the user. Alternatively, the advertisement server communicates directly with the user device 105 and transmits relevant advertisements to the user device 105 based on the displayed content. As these advertisements are relevant to the content that the user is viewing, the advertisements may generate a higher click-through rate than general advertisements.

Various monetization techniques or models may be used in connection with sponsored search advertising, including advertising associated with user search queries, and non-sponsored search advertising, including graphical or display advertising. In an auction-based online advertising marketplace, advertisers may bid in connection with placement of advertisements, although many other factors may also be included in determining advertisement selection or ranking. Bids may be associated with amounts the advertisers pay for certain specified occurrences, such as for placed or clicked-on advertisements, for example. Advertiser payment for online advertising may be divided between parties including one or more publishers or publisher networks, and one or more marketplace facilitators or providers, potentially among other parties.

Some models include guaranteed delivery advertising, in which advertisers may pay based on an agreement guaranteeing or providing some measure of assurance that the advertiser will receive a certain agreed upon amount of suitable advertising, and non-guaranteed delivery advertising, which may be individual serving opportunity-based or spot market-based. In various models, advertisers may pay based on any of various metrics associated with advertisement delivery or performance, or associated with measurement or approximation of a particular advertiser goal. For example, models can include, among other things, payment based on cost per impression or number of impressions, cost per click or number of clicks, cost per action for some specified action, cost per conversion or purchase, or cost based on some combination of metrics, which can include online or offline metrics.

In one embodiment, when a user returns to the web page 150, the web page 150 also includes the top user generated comments associated with the news items that happened during the elapsed time period. In one embodiment, either the news items are new or the comments are new (e.g., haven't previously been seen by the user). In one embodiment, for short return times (like a few minutes), the web page 150 may display top comments that were generated on stories that a user already read. Top comments can be based on one or more factors, such as users' ratings on the comments, response to the comments and/or based on the text of the comments.

Figure 3:
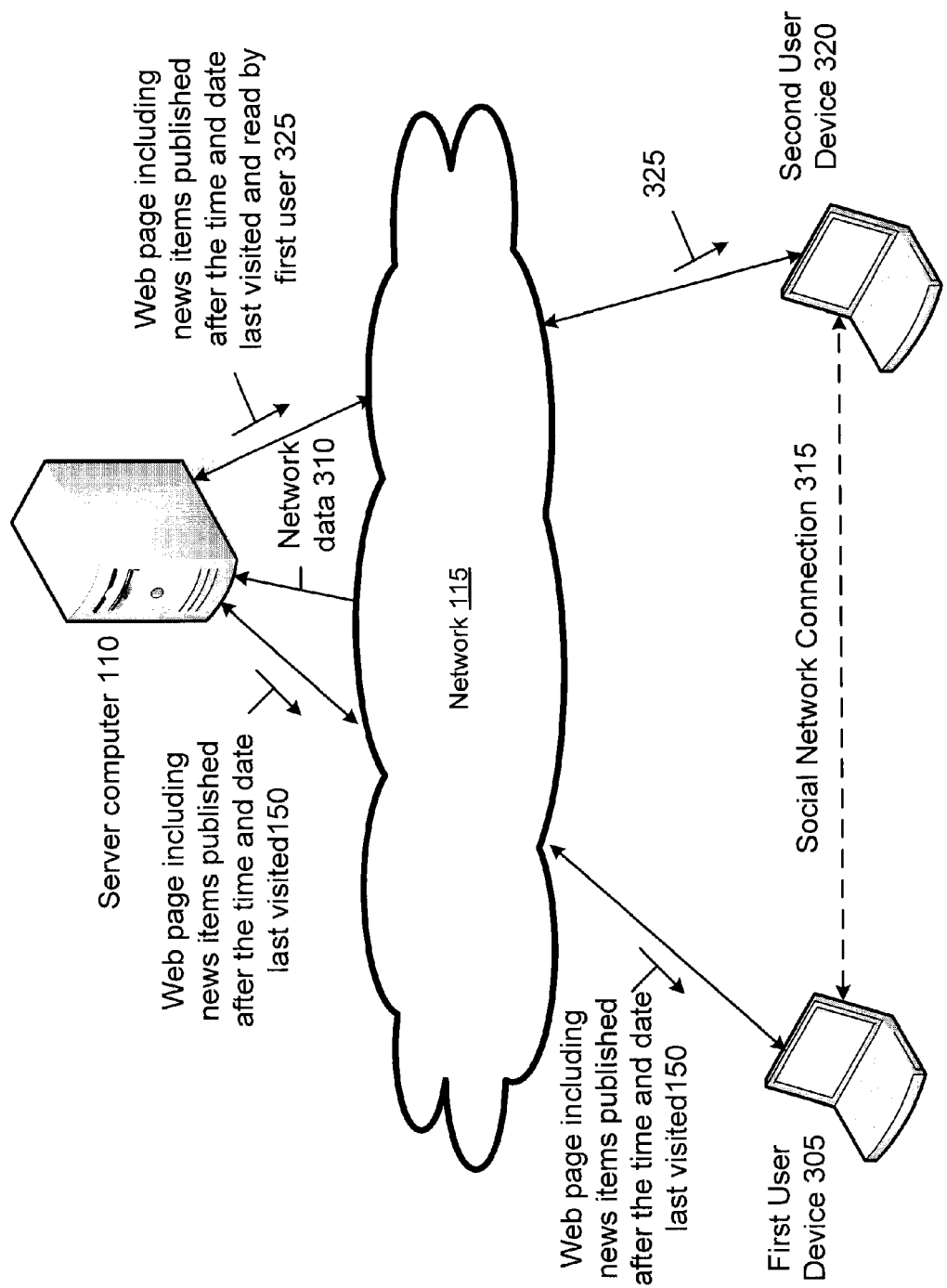
FIG. 3 is a block diagram of a first user device and a second user device in communication with the server computer of FIG. 1 and having a social network connection in accordance with an embodiment of the present disclosure.

Referring to FIG. 3 and in one embodiment, the server computer 110 includes a social networking aspect to the news items displayed. As stated above, the server computer 110 transmits a web page 150 showing news items that were published during an elapsed time to a user device, such as a first user device 305 associated with a first user. In one embodiment, the server computer 110 collects network data 310 from the network 115, such as a social networking site that the first user is a member of and who is part of the first user's social network. In one embodiment, the first user indicates via the first user device 305 which social networking site the server computer 110 should obtain data from. In one embodiment, the server computer 110 determines, from network data 310, that the first user is connected to a second user via social network connection 315. When the second user uses a second user device 320 to log into the social network, in one embodiment the server computer 110 transmits to the second user device 320 a web page 325 showing news items that were published during the elapsed time and that have been read by the first user (e.g., by the second user's friends or connections on the social networking site).

For example, suppose a first user using the first user device 305 is a member of (i.e., has a user account with) the social network FACEBOOK®. Further suppose that this first user is "friends" with a second user using the second user device 320. Suppose that the first user and the second user are both logged onto FACEBOOK® and the first user hasn't checked particular news items in a week. In one embodiment, the server computer 110 will display the news items that have been published within the previous week. If the first user reads a first news item that occurred within the past week, in one embodiment the server computer 110 can transmit a message to the second user device 320 indicating that the first user has read the first news item. In another embodiment, the server computer 110 transmits the first news item directly to the second user device 320 with an indication that the first user read the first news item. In one embodiment, the second user can use the second user device 320 to set preferences as to how these alerts or news items are delivered to the second user device 320 when the second user logs onto the social networking site.

Figure 4:
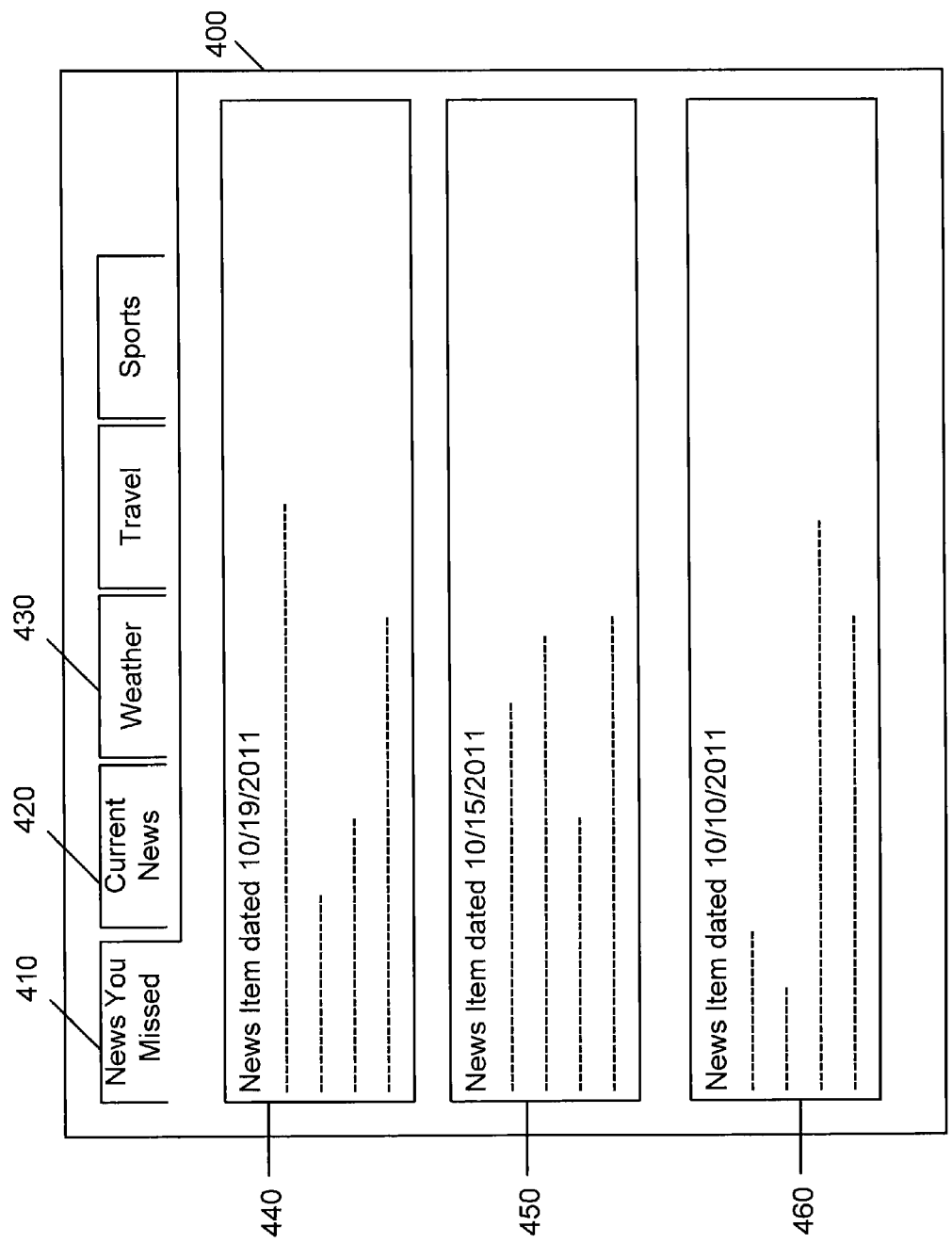
FIG. 4 is an example of a web page displaying news the user missed in accordance with an embodiment of the present disclosure.

FIG. 4 is a block diagram of an embodiment of one non-limiting example of how a web page may make news that the user missed available, in this example a screen shot 400 displayed by the user device 105. The screen shot 400 includes several tabs, such as a News You Missed tab 410, a Current News tab 420, and a Weather tab 430. When the News You Missed tab 410 is selected by the user, in one embodiment several news items are displayed, such as a news item 440 dated Oct. 19, 2011, a news item 450 dated Oct. 15, 2011, and a news item 460 dated Oct. 10, 2011. Although shown in reverse chronological order, the news items 440, 450, 460 can be displayed in any order (e.g., an order selected by the user). Further, in one embodiment the news items 440, 450, 460 display a short excerpt of a detailed news item and can include a link to the more detailed news item. Additionally, although shown as separate tabs, the News You Missed Tab 410 may instead include weather, travel, sports and/or any other news subject. Although shown as a tab in FIG. 4, the news items that a user has missed since the last time the user visited the web page can be displayed in any one or more locations on a home page or landing page of a service, as one or more links, via emails, via RSS feeds, or any other technique used to alert the user of the news items that have been published during the elapsed time.

In one embodiment, the server computer 110 transmits one or more targeted advertisements with the elapsed news items. For example, if a news item 150 is a sports story, the server computer 110 can include an advertisement from NIKE® for sneakers. Thus, when the user uses the user device 105 to view the sports story 150, the server computer 110 also transmits this sneaker advertisement. As these advertisements are relevant to the content that the user is viewing, the advertisements may generate a higher click-through rate than general advertisements.

Figure 5:
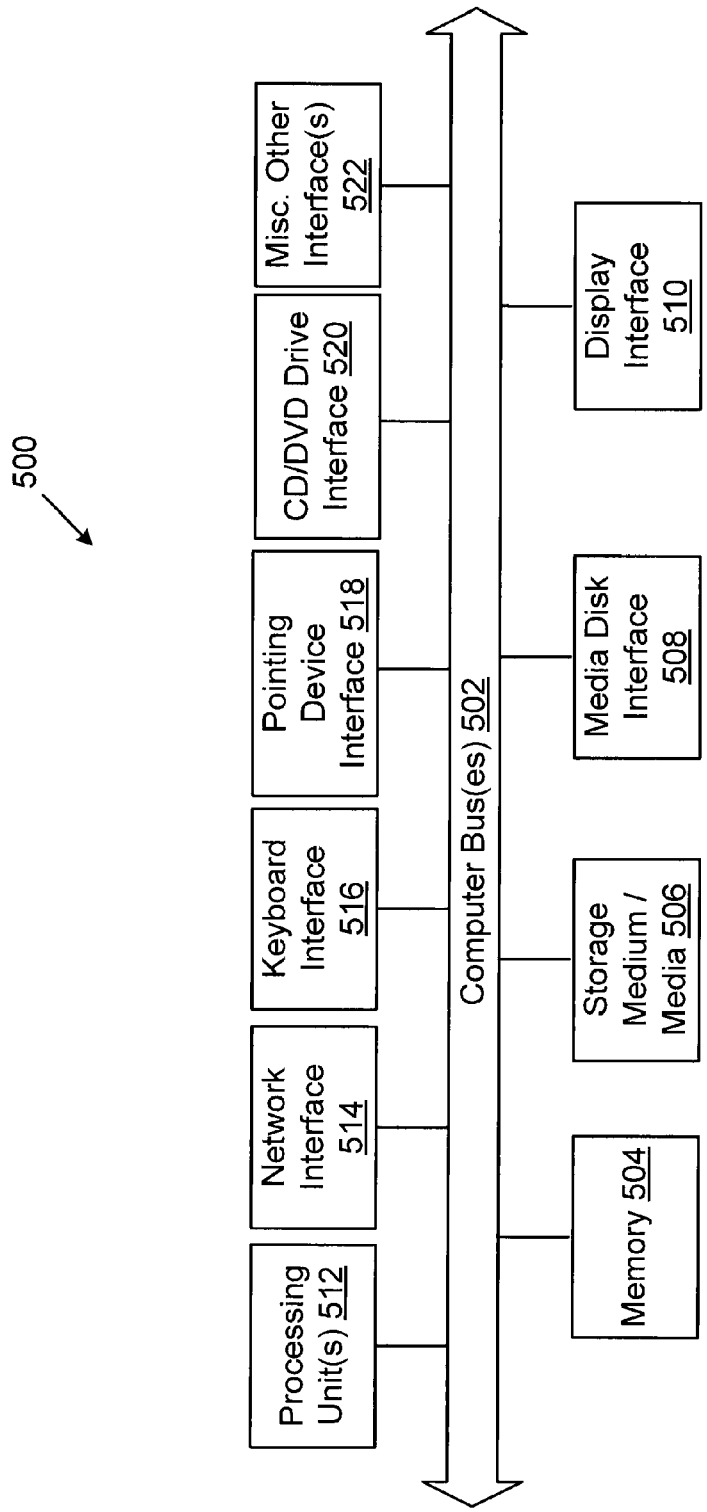
FIG. 5 is a block diagram illustrating an internal architecture of a computer in accordance with an embodiment of the present disclosure.

FIG. 5 is a block diagram illustrating an internal architecture of an example of a computer, such as server computer 110 and/or user device 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 5, internal architecture 500 includes one or more processing units (also referred to herein as CPUs) 512, which interface with at least one computer bus 502. Also interfacing with computer bus 502 are persistent storage medium/media 506, network interface 514, memory 504, e.g., random access memory (RAM), run-time transient memory, read only memory (ROM), etc., media disk drive interface 508 as an interface for a drive that can read and/or write to media including removable media such as floppy, CD-ROM, DVD, etc. media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces, a universal serial bus (USB) interface, and the like.

Memory 504 interfaces with computer bus 502 so as to provide information stored in memory 504 to CPU 512 during execution of software programs such as an operating system, application programs, device drivers, and software modules that comprise program code, and/or computer-executable process steps, incorporating functionality described herein, e.g., one or more of process flows described herein. CPU 512 first loads computer-executable process steps from storage, e.g., memory 504, storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

Persistent storage medium/media 506 is a computer readable storage medium(s) that can be used to store software and data, e.g., an operating system and one or more application programs. Persistent storage medium/media 506 can also be used to store device drivers, such as one or more of a digital camera driver, monitor driver, printer driver, scanner driver, or other device drivers, web pages, content files, playlists and other files. Persistent storage medium/media 506 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving at a web site, by a computer, a request from a user device of a user to display a news item web page;
determining, by the computer, a time and date that the user previously visited the web site to view news items;
identifying, by the computer, news items published after the determined time and date, the identifying further comprising determining a topic of one of the news items viewed by the user and identifying news items published after the determined time and date that relate to the determined topic;
dynamically generating, by the computer, a web page comprising at least a portion of the identified news items; and
transmitting, by the computer, the generated web page to the user device.

2. The method of claim 1, wherein the determining of the time and date that the user previously visited the web site further comprises retrieving, by the computer from the user device, a cookie associated with the user, the cookie comprising information related to the time and date that the user previously visited the web site.

3. The method of claim 1, wherein the determining of the time and date that the user previously visited the web site further comprises obtaining, by the computer, a user profile associated with the user, the user profile comprising information related to the time and date that the user previously visited the web site.

4. The method of claim 1, wherein the identifying news items published after the determined time and date further comprises determining a location of the user device and identifying news items associated with the location of the user device.

5. The method of claim 1, wherein the transmitting the generated web page further comprises transmitting an advertisement to the user device, the advertisement related to the at least a portion of the identified news items.

6. The method of claim 1, wherein the transmitting the generated web page further comprises transmitting the generated web page to a social network connection of the user on a social network.

7. The method of claim 1, further comprising transmitting, by the computer, a question to the user to identify a previous time of access.

8. The method of claim 1, further comprising transmitting, by the computer, a question to the user to identify a preferred past time period over which to retrieve news items that the user may have missed.

9. A computer comprising:
a processor;
a storage medium for tangibly storing thereon program logic for execution by the processor, the program logic comprising:
receiving logic executed by the processor for receiving at a web site a request from a user device to display a news item web page;
determining logic executed by the processor for determining a time and date that the user previously visited the web site to view news items;
identifying logic executed by the processor for identifying news items published after the determined time and date, the identifying further comprising determining a topic of one of the news items viewed by the user and identifying news items published after the determined time and date that relate to the determined topic;
generating logic executed by the processor for dynamically generating a web page comprising at least a portion of the identified news items; and
transmitting logic executed by the processor for transmitting the generated web page to the user device.

10. The computer of claim 9, wherein the determining logic further comprises retrieving logic executed by the processor for retrieving a cookie associated with the user, the cookie comprising information related to the time and date that the user previously visited the web site.

11. The computer of claim 9, wherein the determining logic for determining the time and date that the user previously visited the web site further comprises obtaining logic executed by the processor for obtaining a user profile associated with the user, the user profile comprising information related to the time and date that the user previously visited the web site.

12. The computer of claim 9, wherein the identifying logic further comprises determining logic executed by the processor for determining a location of the user device and identifying news items associated with the location of the user device.

13. The computer of claim 9, wherein the transmitting logic further comprises transmitting logic executed by the processor for transmitting an advertisement to the user device, the advertisement related to the at least a portion of the identified news items.

14. The computer of claim 9, wherein the transmitting logic further comprises transmitting logic executed by the processor for transmitting the generated web page to a social network connection of the user on a social network.

15. The computer of claim 9, further comprising transmitting logic executed by the computer to transmit a question to the user to identify a previous time of access.

16. The computer of claim 9, further comprising transmitting logic executed by the computer to transmit a question to the user to identify a preferred past time period over which to retrieve news items that the user may have missed.

17. A non-transitory computer readable storage medium tangibly storing computer program instructions capable of being executed by a computer processor, the computer program instructions defining the steps of:
   receiving at a web site, by a computer, a request from a user device to display a news item web page;
   determining, by the computer, a time and date that the user previously visited the web site to view news items;
   identifying, by the computer, news items published after the determined time and date, the identifying further comprising determining a topic of one of the news items viewed by the user and identifying news items published after the determined time and date that relate to the determined topic;
   dynamically generating, by the computer, a web page comprising at least a portion of the identified news items; and
   transmitting, by the computer, the generated web page to the user device.

18. The non-transitory computer readable storage medium of claim 17, wherein the computer program instructions defining the step of determining the time and date that the user previously visited the web site further comprises computer program instructions defining the step of retrieving, by the computer from the user device, a cookie associated with the user, the cookie comprising information related to the time and date that the user previously visited the web site.

19. The non-transitory computer readable storage medium of claim 17, wherein the computer program instructions defining the step of determining the time and date that the user previously visited the web site further comprises computer program instructions defining the step of obtaining, by the computer, a user profile associated with the user, the user profile comprising information related to the time and date that the user previously visited the web site.

20. The non-transitory computer readable storage medium of claim 17, wherein the computer program instructions defining the step of identifying news items published after the determined time and date further comprises determining a location of the user device and identifying news items associated with the location of the user device.

21. The non-transitory computer readable storage medium of claim 17, wherein the computer program instructions defining the step of transmitting the generated web page further comprises computer program instructions defining the step of transmitting an advertisement to the user device, the advertisement related to the at least a portion of the identified news items.

22. The non-transitory computer readable storage medium of claim 17, wherein the computer program instructions defining the step of transmitting the generated web page further comprises computer program instructions defining the step of transmitting the generated web page to a social network connection of the user on a social network.

* * * * *